UNITED STATES PATENT OFFICE.

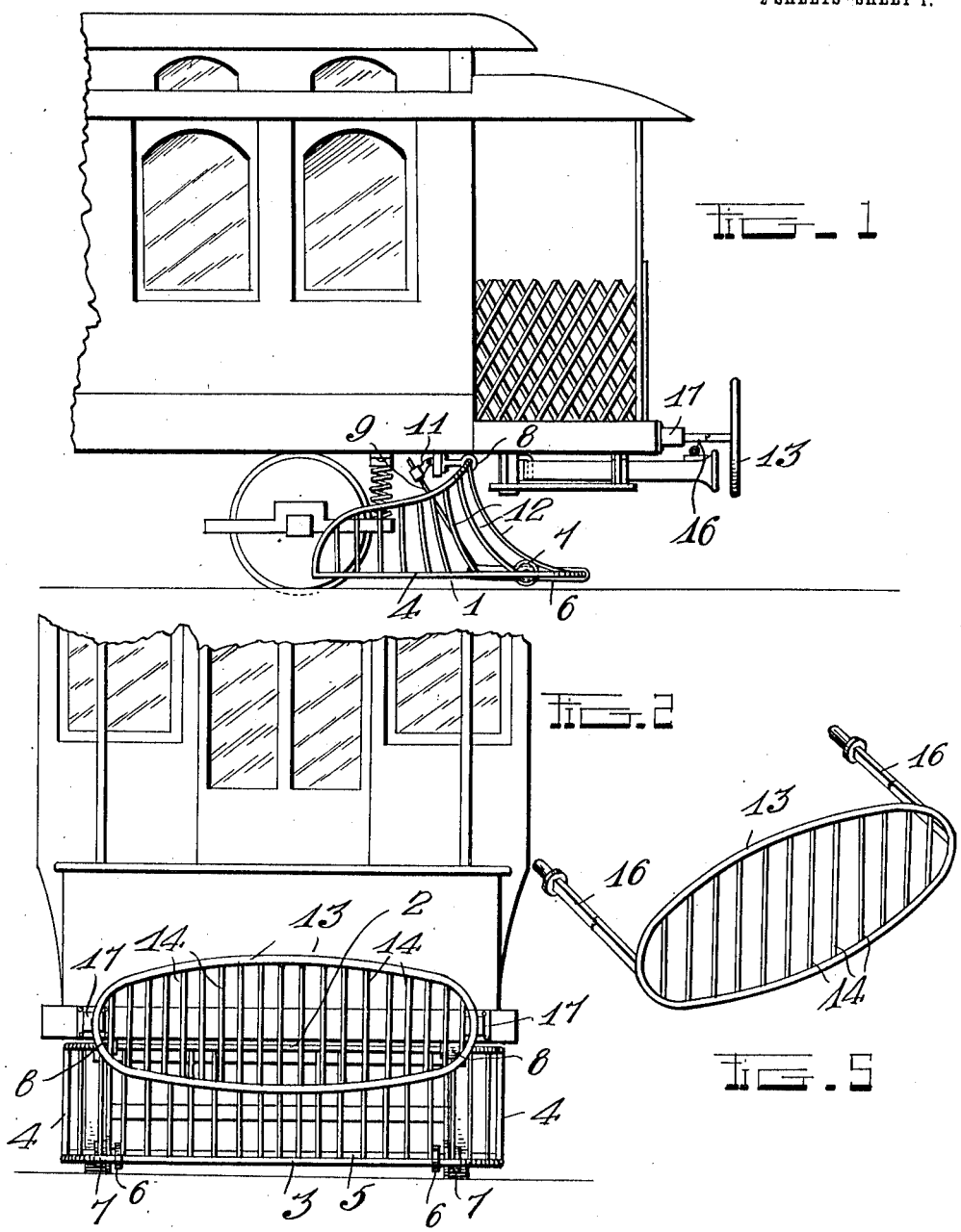

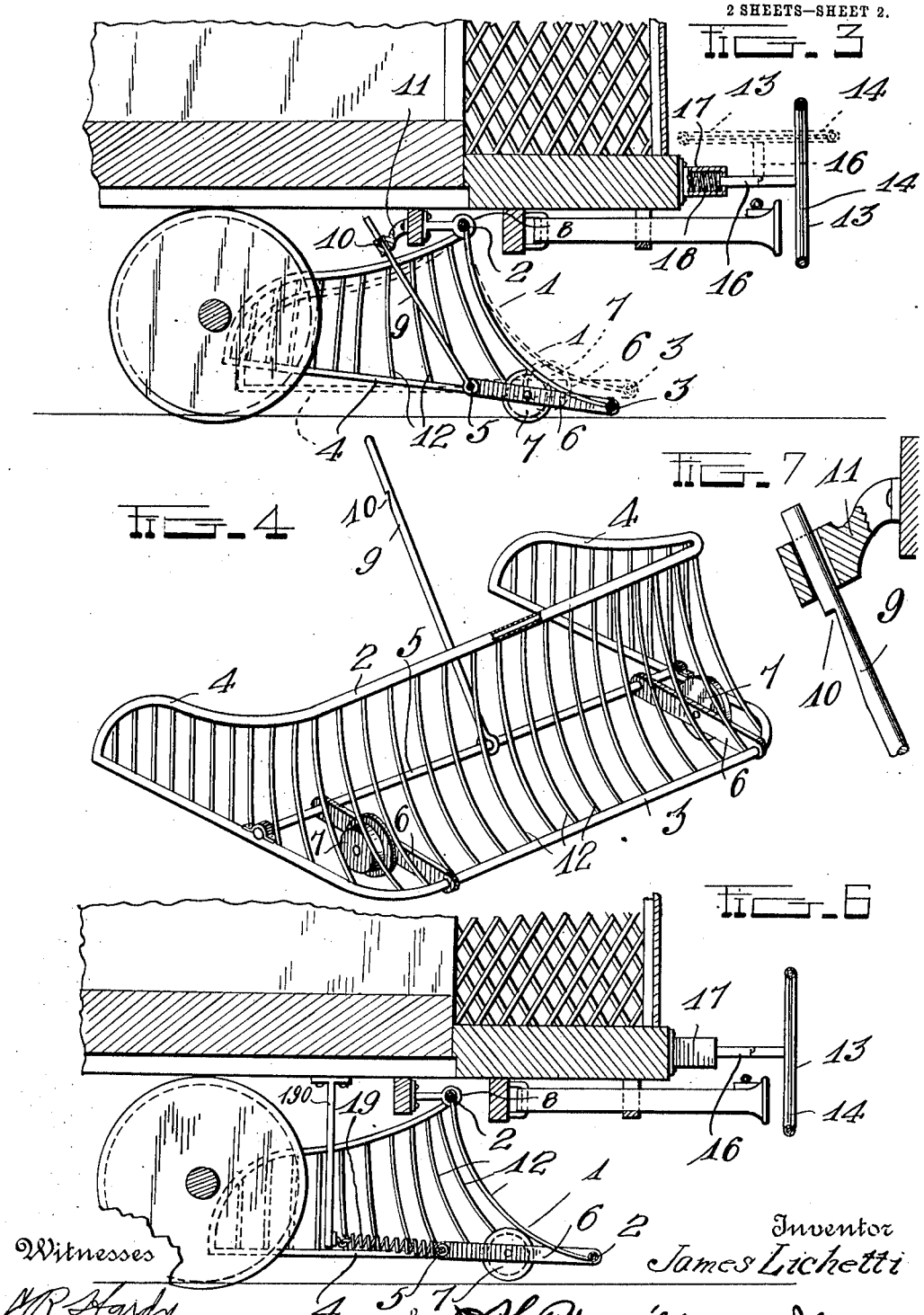

JAMES LICHETTI, OF PHILADELPHIA, PENNSYLVANIA.

CAR-FENDER.

1,019,671. Specification of Letters Patent. Patented Mar. 5, 1912.

Application filed July 3, 1911. Serial No. 636,773.

*To all whom it may concern:*

Be it known that I, JAMES LICHETTI, a citizen of the United States, residing at Philadelphia, in the county of Philadelphia and State of Pennsylvania, have invented certain new and useful Improvements in Car-Fenders; and I do declare the following to be a full, clear, and exact description of the invention, such as will enable others skilled in the art to which it appertains to make and use the same.

This invention relates to improvements in car fenders.

One object of the invention is to provide an improved car fender whereby the wheels of the car will be prevented from passing over a person or object struck by the car, and improved supporting means whereby when the fender comes into engagement with an obstruction, it will be thrown down and locked in close proximity with the tracks and thus prevented from passing over the obstruction.

A further object is to provide a yieldingly supported supplemental fender or guard for the front end and coupling bar of the car whereby these parts will be prevented from injuring the person or object struck and which may be swung up to an out of the way position to permit the car to be coupled onto another car.

With these and other objects in view the invention consists of certain novel features of construction and the combination and arrangement of parts as will be more fully described and claimed.

In the accompanying drawings: Figure 1 is a side view of the front end of a car showing the invention applied thereto; Fig. 2 is a front end view of the same; Fig. 3 is a vertical sectional view through the front end of the car and the fender, showing the fender swung down and locked in operative position in full lines, and in raised or inoperative position in dotted lines, and showing the supplemental fender in an operative position in full lines and in an inoperative position in dotted lines; Fig. 4 is a detail perspective view of the fender; Fig. 5 is a similar view of the supplemental fender; Fig. 6 is a view similar to Fig. 3 showing the fender provided with springs whereby the same is automatically retracted to an inoperative position after being thrown down by its engagement with an obstruction; Fig. 7 is an enlarged detail sectional view of the catch mechanism for holding the fender down in operative position.

My improved fender 1 comprises a frame consisting of an upper cross bar 2 and a lower cross bar 3, said cross bar 3 being disposed a suitable distance in advance of the upper cross bar 2. The cross bars 2 and 3 are bent rearwardly at their ends to form end portions 4 of the frame and wheel guarding members of the fender. The rearwardly extending ends of the lower bar 3 are connected together by a brace bar 5 to which and to the front bar 3 are connected longitudinally disposed wheel supporting bars 6 on which are revolubly mounted fender supporting wheels or rollers 7 which, when the fender is thrown down to an operative position are adapted to engage and travel on the railway tracks.

The upper cross bar 2 of the fender is adapted to be engaged with suitable supporting brackets 8 secured to the bottom of or to the front truck of the car. The location of the pivotal cross bar 2 nearer to the front than to the rear of the fender, causes the heavier rear portion to raise the front portion and normally hold it raised.

Pivotally connected at its lower end to the brace bar 5 is a locking bar 9 having formed therein a locking notch 10 adapted to be engaged with a suitable catch and supporting bracket 11 secured to the frame or front truck of the car and with which the upper end of the locking bar 9 is slidably engaged. The outer end of the fender when coming into engagement with an obstruction will be thrown downwardly until the wheels or rollers 7 on the bars 6 engage the track rails which movement of the fender will bring the notch 10 in the bar 9 into engagement with the catch member or bracket 11 thereby locking the fender in its lowered or operative position. When thus forced down and locked the front end of the fender will be within a very short distance above the rails, in which position the same will be held until the locking bar 9 is manually released.

The body portion of the fender may be constructed in any suitable manner but is here shown and is preferably formed of a series of curved bars or ribs 12 which are secured at their ends to the upper and lower bars 2 and 3 and end portions 4 of the frame. The lower cross bar 3 may, if desired be provided with a rubber covering to prevent the same from injuring the person or object struck thereby. When constructed and arranged as shown it will be readily seen that the rearwardly extending end portions 4 of the frame cover and effectually guard the front wheels of the car thus preventing the wheels from passing over any object struck by the car.

In addition to the wheel fender 1, I provide a body fender 13 adapted to be arranged across the front of the car and over the draw bar as shown. The fender 13 preferably comprises an elliptical shaped frame to which is secured a series of vertically disposed parallel cross bars 14 which may be formed of any suitable material. The fender 13 is yieldingly supported in position at its ends by means of short bars 16 which have their inner ends slidably engaged with guide brackets 17 in which are arranged coiled pressure resisting springs 18 with which the inner ends of the bars 16 are engaged. By thus arranging the springs 18 and bars 16 the fender 13 will be yieldingly supported in operative position so that should a person or object be struck by the fender the latter will give or yield against the pressure of such contact and will thus be prevented from injuring the person or object. If desired the frame of the fender 13 may be covered with rubber or other soft material. The supporting bars 16 are formed in hinged sections connected by a rule joint whereby the fender will be supported in an operative position in front of the draw bar but may be readily swung upwardly and rearwardly to a horizontal position and from in front of the draw bar thus permitting the car to be coupled with another car or a draft device applied to the coupler.

In Fig. 6 of the drawings is shown a slightly modified construction of the fender. In this instance the positive locking bar 9 is dispensed with and in place thereof are supplied fender retracting springs 19 the forward ends of which are connected to the cross bar 5 of the fender while the rear ends are connected to a bracket 190 depending from the truck or other part of the car, whereby the forward end of the fender after being pressed down by contact with an obstruction will be returned to its normal position when the obstruction has been removed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention what I claim is:

1. A car fender comprising a frame consisting of bars arranged and bent to form upper and lower cross bars and end portions, ribs arranged across said fender and connecting said bars of the frame, a brace bar connected to the opposite rearwardly extending ends of the lower cross bar, wheel supporting bars secured to said brace bar and lower cross bar of the frame, fender supporting and track engaging wheels revolubly mounted in said wheel supporting bars, a combined catch and guide bracket secured to the car, a catch bar pivotally connected to the brace bar of the fender, said catch bar having formed therein a notch adapted to engage said combined catch and guide bracket whereby when the fender is swung down to an operative position the same will be automatically locked in this position.

2. A car fender comprising a frame having upper and lower cross bars and laterally extending end portions, a series of ribs to connect said bars and end portions of the frame, means to pivotally connect said fender to the under side of the car, a supplemental fender comprising a frame, a series of ribs arranged across said frame, supporting brackets secured to the front end of the car, shafts secured to the ends of said fender frame and having a sliding engagement with said brackets, springs arranged in said brackets and adapted to yieldingly hold the fender in operative position, said shafts being formed in hingedly connected sections whereby the fender may be swung upwardly to an inoperative position to permit the coupling of the car to another car or draft device.

3. A car fender comprising a frame consisting of upper and lower cross bars, and rearwardly extending end portions adapted to form wheel guards, a series of ribs secured to said bars to form the body of the fender, a brace bar adapted to connect the rearwardly projecting portions of the lower cross bar, wheel supporting bars secured in the lower portion of said frame, supporting wheels revolubly mounted on said bars, means to pivotally connect the upper cross bar of the fender to the car, and means for normally and yieldingly maintaining the front of the fender in a raised position until it strikes an obstruction.

In testimony whereof I have hereunto set my hand in presence of two subscribing witnesses.

JAMES LICHETTI.

Witnesses:
W. H. HOOD,
EDWARD SHAMBELAN.